US009671803B2

(12) United States Patent
Oikarinen

(10) Patent No.: US 9,671,803 B2
(45) Date of Patent: Jun. 6, 2017

(54) LOW DROP OUT SUPPLY ASYMMETRIC DYNAMIC BIASING

(71) Applicant: Fairchild Semiconductor Corporation, San Jose, CA (US)

(72) Inventor: Juha Joonas Oikarinen, Santa Clara, CA (US)

(73) Assignee: FAIRCHILD SEMICONDUCTOR CORPORATION, San Jose, CA (US)

( * ) Notice: Subject to any disclaimer, the term of this patent is extended or adjusted under 35 U.S.C. 154(b) by 159 days.

(21) Appl. No.: 14/523,233

(22) Filed: Oct. 24, 2014

(65) Prior Publication Data

US 2015/0115918 A1 Apr. 30, 2015

Related U.S. Application Data

(60) Provisional application No. 61/895,756, filed on Oct. 25, 2013.

(51) Int. Cl.

| | |
|---|---|
| ***H02J 3/12*** | (2006.01) |
| ***G05F 1/573*** | (2006.01) |
| ***G05F 1/00*** | (2006.01) |
| ***G05F 1/575*** | (2006.01) |

(52) U.S. Cl.

CPC .................................... *G05F 1/575* (2013.01)

(58) Field of Classification Search

CPC .......... G05F 1/461; G05F 1/462; G05F 1/465; G05F 1/56; G05F 1/561; G05F 1/562; G05F 1/563; G05F 1/565; G05F 1/573; G05F 1/575

USPC ....... 323/242, 243, 246, 266, 274–277, 279, 323/280, 282–285, 289, 311, 312–317; 361/18

See application file for complete search history.

(56) References Cited

U.S. PATENT DOCUMENTS

| | | | | |
|---|---|---|---|---|
| 6,411,068 B1 * | 6/2002 | Willis | H02M 3/1563 | 323/282 |
| 8,169,203 B1 * | 5/2012 | Vemula | G05F 1/575 | 323/273 |
| 2011/0193538 A1 * | 8/2011 | Arigliano | G05F 1/563 | 323/282 |
| 2012/0181999 A1 * | 7/2012 | Weng | H02M 1/08 | 323/282 |
| 2012/0262135 A1 * | 10/2012 | Childs | G05F 1/575 | 323/269 |

* cited by examiner

*Primary Examiner* — Adolf Berhane
*Assistant Examiner* — Gary Nash
(74) *Attorney, Agent, or Firm* — Schwegman Lundberg & Woessner, P.A.

(57) ABSTRACT

Methods and apparatus for a dynamic bias generator are provided. In an example, a dynamic bias generator for a voltage regulator can include a slope generator and a peak detector coupled to the slope generator. In certain examples, the slope generator and the peak detector can receive a representation of output current of the voltage regulator and can adjust a bias control voltage at an output of the peak detector in response to a change in the output current of the voltage regulator.

19 Claims, 3 Drawing Sheets

LOW DROP OUT SUPPLY ASYMMETRIC DYNAMIC BIASING

CLAIM OF PRIORITY AND RELATED APPLICATIONS

This application claims the benefit of priority under 35 U.S.C. 119(e) to Oikarinen, U.S. Provisional Patent Application No. 61/895,756, filed on Oct. 25, 2013, and entitled, "ASYMMETRIC DYNAMIC BIASING FOR HIGH PSRR, LOW QUIESCENT CURRENT LDO WITH PEAK DETECTORS," which is hereby incorporated by reference herein in its entirety.

BACKGROUND

Electronic devices can rely on one or more regulated voltages to provide their designed functionality. Lightly loaded voltage regulators such as low quiescent current voltage regulators can become unstable and provide low performance during transients. Correction of one issue, such as stability, can result the further degrading of load transient performance or other characteristics, and vice versa.

OVERVIEW

Methods and apparatus for a dynamic bias generator are provided. In an example, a dynamic bias generator for a voltage regulator can include a slope generator and a peak detector coupled to the slope generator. In certain examples, the slope generator and the peak detector can receive a representation of output current of the voltage regulator and can adjust a bias control voltage at an output of the peak detector in response to a change in the output current of the voltage regulator.

This summary is intended to provide a partial overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized methods and apparatus that provide stability and improved load transient performance for high power supply rejection ratio (PSRR), low drop out (LDO) voltage regulators including ultra-low quiescent current LDOs. In certain examples, quiescent current of an LDO regulator can be low enough to allow the LDO to be constantly enabled without significantly impacting charge life of a power cell of a mobile electronic device. In certain examples, an example dynamic biasing scheme can provide improved stability of an LDO over a wide load range starting from zero amps while maintaining stability and fast load transient response despite reduced device bias in zero load state.

Figure 1:
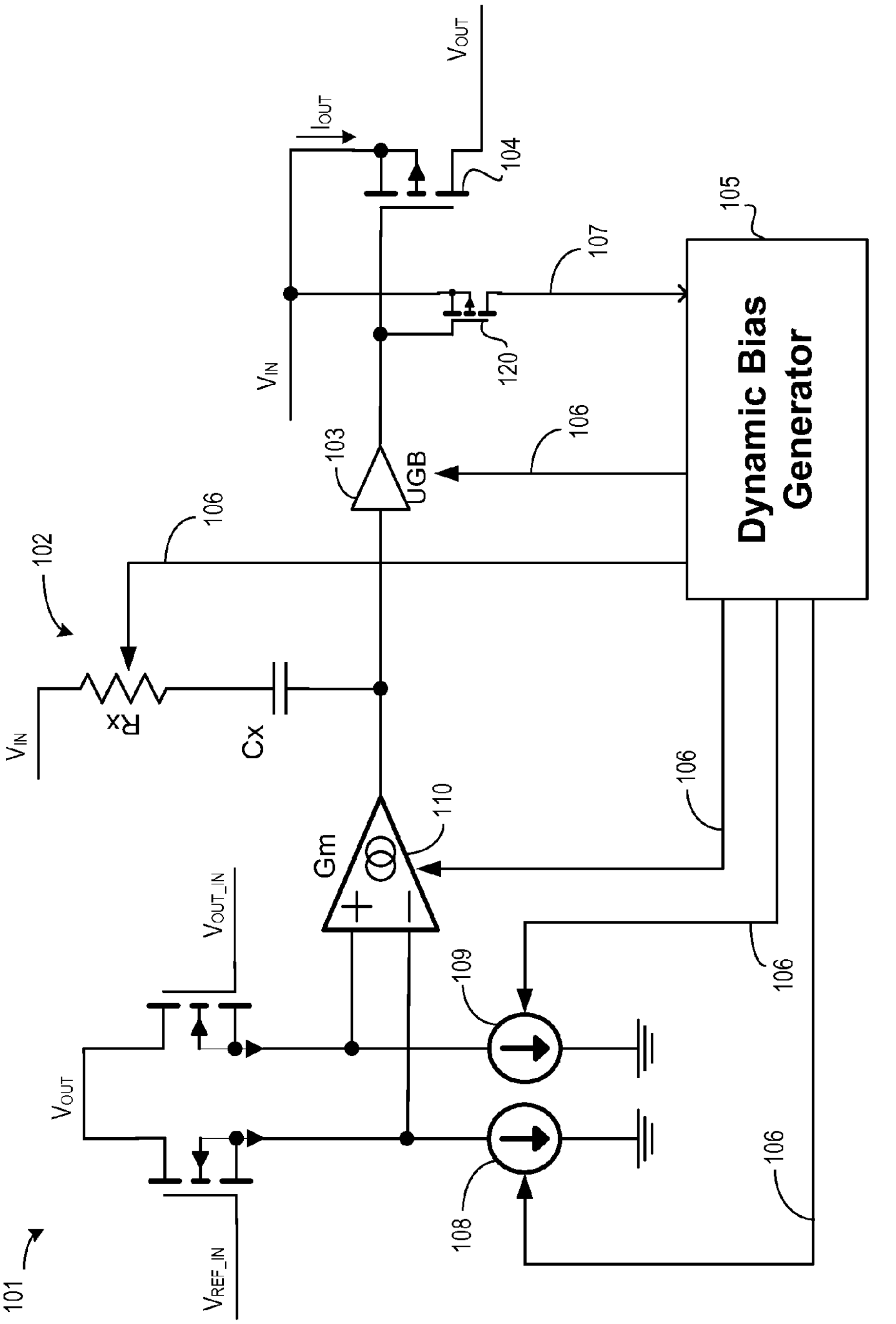
FIG. 1 illustrates generally and example ultra-low quiescent current low dropout voltage regulator.

FIG. 1 illustrates generally and example ultra-low quiescent current low dropout voltage regulator 100. In certain examples, the ultra-low quiescent current low dropout voltage regulator 100 can include an error amplifier 101, a loop compensation circuit 102, a buffer 103, such as a unity gain buffer (UGB) and a power switch 104. In some examples, the error amplifier 101 can receive a reference voltage ($V_{REF\_IN}$) and an output voltage ($V_{OUT}$) of the voltage regulator or representation of the output voltage ($V_{OUT\_IN}$). The error amplifier 101 can then compare the voltages ($V_{REF\_IN}$, $V_{OUT\_IN}$ or $V_{OUT}$) to provide a drive signal for the power switch 104. In some examples, the error amplifier can include a sub-amplifier 110, such as but not limited to a trans-impedance amplifier. In some examples, a pre-amplifier circuit of the error amplifier 101 can include one or more bias sources, such as bias current sources 108, 109, that can be responsive to a control or trim signal. In some examples, the compensation circuit 102 can include a filter such as a resistance and capacitance filter for filtering changes in an error signal provided by the error amplifier 101. In some examples, the compensation circuit 102 can include a resistor (Rx)/capacitor (Cx) network having a control node for setting a resistance or capacitance of the RC network. In certain examples, the voltage regulator 100 can include a dynamic bias generator 105 to provide bias information 106 to one or more components of the ultra-low quiescent current low dropout voltage regulator 100. In certain examples, the dynamic bias generator 105 can adjust bias information 106 using a representation 107 of the LDO output current. In some examples, the representation 107 of the LDO output current can include a mirrored signal indicative of the LDO output current. In some examples, the mirrored signal can include a mirrored current provided by a mirror transistor 120 working in conjunction with the power switch 104 that can be a small fraction of the actual output current. In some examples, the mirrored current can be on the order of the actual output current of the voltage regulator 100. In response to changes in output current, the dynamic bias generator 105 can modify loop parameters, loop characteristics, or the transfer function of the voltage regulator 100. In certain examples, the dynamic bias generator 105 can include a peak detector to detect an increase in output current and to quickly respond to the increase in output current to limit and correct any output voltage ($V_{OUT}$) drop due to the increase in output current. In certain examples, the dynamic bias generator 105 can include one or more outputs that can be coupled to various adjustable loop components of the voltage regulator 100. The dynamic bias generator 105 can use the one or more outputs to modulate loop parameters of the voltage regulator 100 such that the voltage regulator 100 can quickly respond to increases in output current as well as maintain stability and maintain a low quiescent current consumption as the output current approaches and remains at a light load state. In certain examples, the outputs of the dynamic bias generator 105 can be used to adjust certain loop characteristics including, but not limited to, one or more of bias current sources 108, 109 of the error amplifier 101, a gain of a sub-amplifier 110 of the error amplifier 101, a compensation parameter of the compensation circuit 102, the bandwidth of the buffer 103 or combinations thereof. Such loop characteristics can be adjusted by coupling an output of the dynamic bias generator 105 to a control node of the corresponding voltage regulator component.

Figure 2:
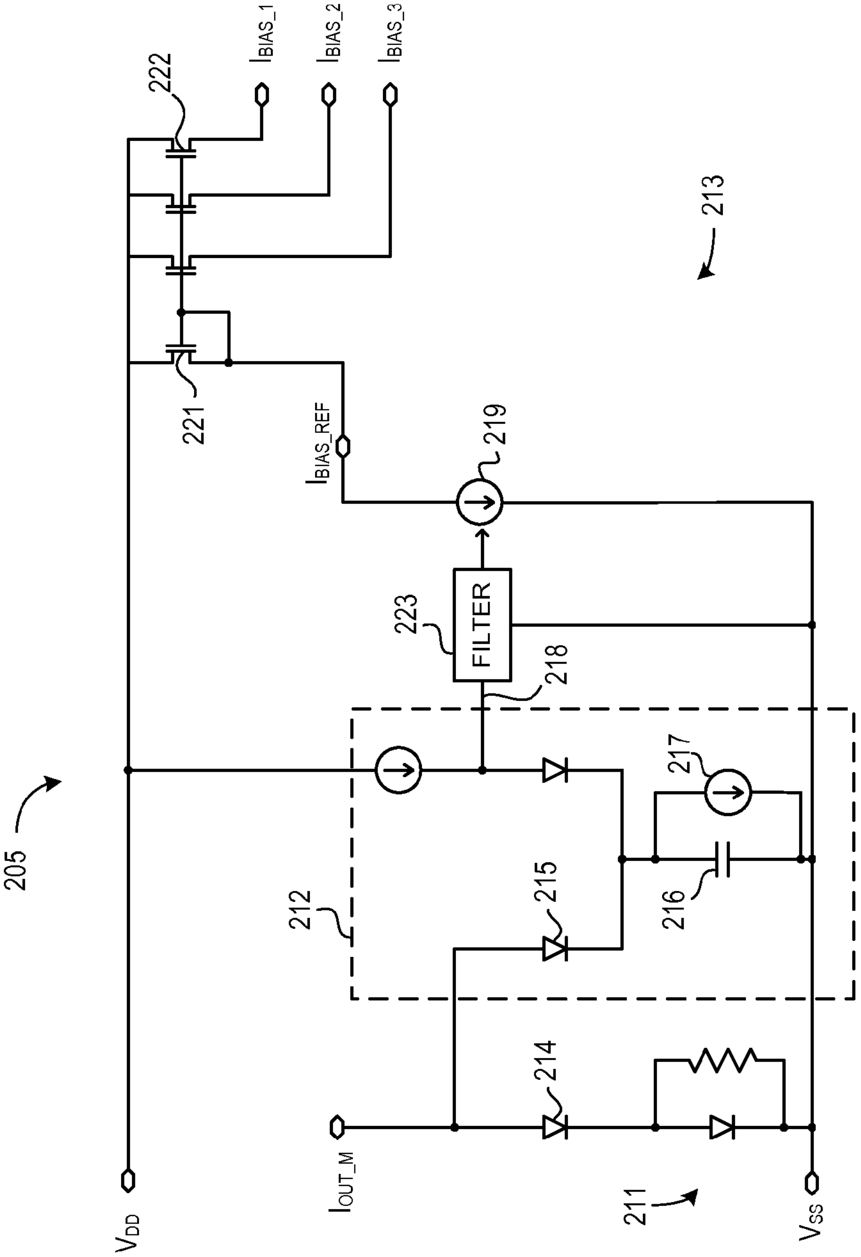
FIG. 2 illustrates generally an example dynamic bias generator.

FIG. 2 illustrates generally an example dynamic bias generator 205. In certain examples, the dynamic bias generator 205 can include an input for receiving a scaled representation ($I_{OUT\_M}$) of the output current of a voltage regulator, such as the voltage regulator of FIG. 1. In some examples, the dynamic bias generator 205 can include a transistor of a current mirror configured to provide the scaled representation ($I_{OUT\_M}$) of the output current of the voltage regulator. In some examples, the scaled representation ($I_{OUT\_M}$) of the output current can be a current signal having a fraction of the actual output current of the voltage regulator.

In certain examples, the dynamic bias generator 205 can include a rate generator 211, a peak detector 212, and an output driver circuit 213. In certain examples, the rate generator 211 can define the response rate of the peak detector 212 to increases in output current of the voltage regulator. The peak detector 212 can provide and maintain a peak detector signal indicative of the output current of the voltage regulator. In certain examples, a pair of diodes 214, 215 can couple the rate generator 211 and the peak detector 212. In some examples, the pair of diodes 214, 215 are a matched pair of diodes in that the diodes 214, 215 are fabricated together and are virtually identical. In certain examples, a peak detector capacitor can assist in maintaining the output level of the peak detector until the output current of the voltage regulator decreases. In certain examples, as the output current of the voltage regulator increases, a voltage across a peak detector capacitor 216 can increase. In response to the higher voltage across the peak detector capacitor 216, the one or more output signals ($I_{BIAS\_1}$, $I_{BIAS\_2}$, $I_{BIAS\_3}$) of the dynamic bias generator 205 can adjust loop parameters of the voltage regulator to be more responsive and to have a higher control bandwidth.

As the output current, or output current demand, of the voltage regulator decreases, the voltage across the peak detector capacitor 216 can decrease. In response to the lower voltage across the peak detector capacitor 216 the output signals ($I_{BIAS\_1}$, $I_{BIAS\_2}$, $I_{BIAS\_3}$) of the dynamic bias generator 205 adjust the loop parameters to reduce the responsiveness and lower the control loop bandwidth. In certain examples, the peak detector 212 can include a discharge current source 217 that can discharge the peak detector capacitor 216. In some examples, the discharge time of the peak detector capacitor 216 can be much longer than the charge time so that the regulator loop maintains stability as output current of the regulator decreases and the regulator enters light load conditions. In certain examples, the discharge current source 217 can provide or sink 100 nanoamps (nA) of current.

In certain examples, the output 218 of the peak detector 212 can couple to the output driver circuit 213 of the dynamic bias generator 205. In certain examples, the output driver circuit 213 of the dynamic bias generator can include an adjustable current source or sink 219 to provide a bias reference current ($I_{BIAS\_REF}$) and a current mirror having a current sense transistor 221 and output circuits including one or more mirror transistors 222 to provide one or more mirrored output signals ($I_{BIAS\_1}$, $I_{BIAS\_2}$, $I_{BIAS\_3}$). As discussed above, the output signals ($I_{BIAS\_1}$, $I_{BIAS\_2}$, $I_{BIAS\_3}$) of the dynamic bias generator 205 can be used to adjust loop parameters of the voltage regulator in response to the output current of the voltage regulator via the scaled representation ($I_{OUT\_M}$) of the output current. It is understood that a dynamic bias generator 205 can include more or less outputs than generally shown in FIG. 2 without departing from the scope of the present subject matter. In certain examples, a filter 223 can process the output of the peak detector 212. In some examples, the filter 223 can include a resistor and a capacitor to form a low pass filter.

Figure 3:
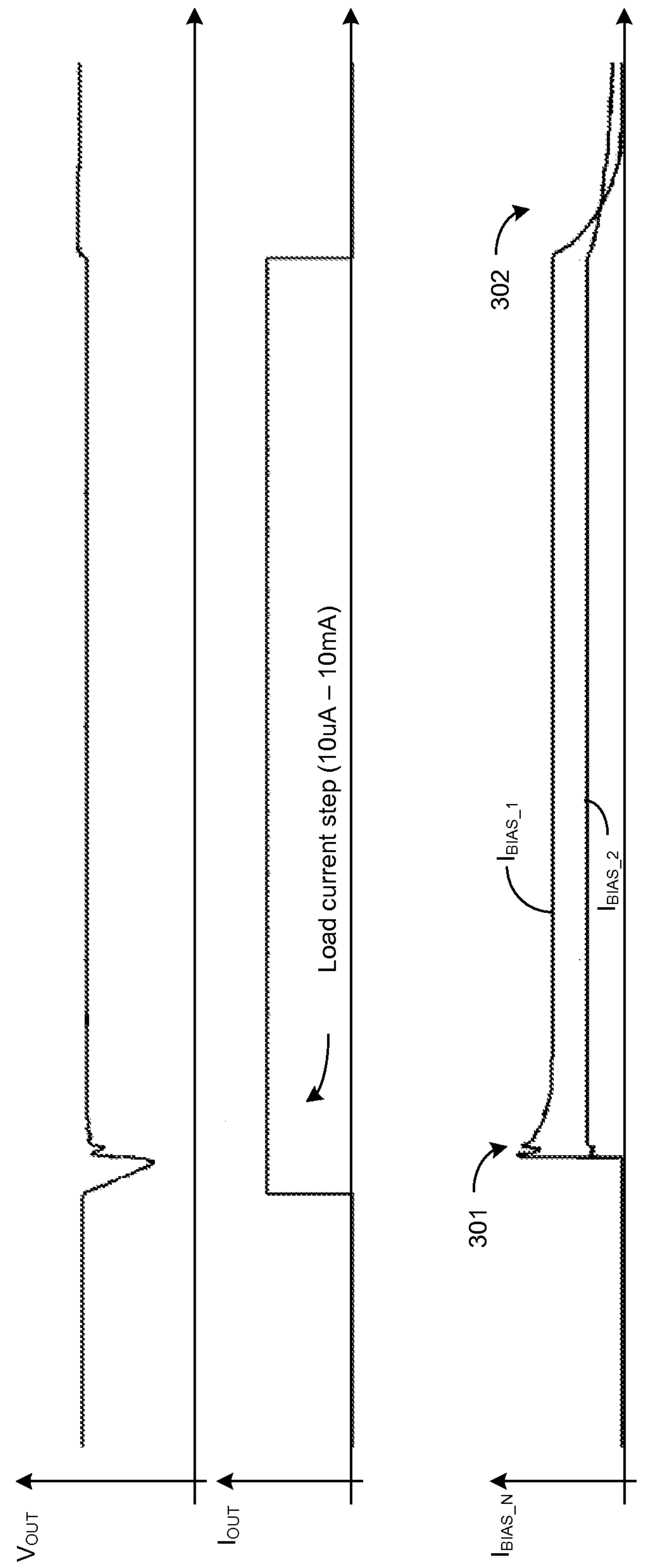
FIG. 3 illustrates graphically the improved performance of a LDO regulator according to an example of the present subject matter.

FIG. 3 illustrates graphically the improved performance of a LDO regulator according to the present subject matter. The graph illustrates the output voltage ($V_{OUT}$), load current ($I_{OUT}$), and two bias outputs ($I_{BIAS\_1}$, $I_{BIAS\_2}$) of the dynamic bias generator of an LDO regulator as the load current steps from 10 uAmps to 10 mA and back to 10 uA. At 401, the LDO bias current rises very quickly to meet the increased load. At 402, the LDO bias current slopes slowly to prevent instability during entry to low quiescent current operation (e.g., the LDO loop in a very low bandwidth mode).

Examples and Notes

In Example 1, a dynamic bias generator for a voltage regulator can include a slope generator and a peak detector coupled to the slope generator. In certain examples, the slope generator and the peak detector can be configured to receive a representation of output current of the voltage regulator and to adjust a bias control voltage at an output of the peak detector in response to a change in the output current of the voltage regulator.

In Example 2, the peak detector of Example loptionally includes a first diode configured to receive the representation of the output current of the voltage regulator and a detect capacitor coupled to the first diode and configured to charge when the representation of the output current indicates an increasing output current demand.

In Example 3, a charge rate of the detect capacitor of any one or more of Examples 1-2 optionally is determined by the slope generator.

In Example 4, the peak detector of any one or more of Examples 1-3 optionally includes a discharge current source configured to discharge the detect capacitor when the output current indicates a decreasing output current demand.

In Example 5, the slope generator of any one or more of Examples 1-4 optionally includes a second diode coupled in parallel with a slope generator resistance.

In Example 6, the dynamic bias generator of any one or more of Examples 1-5 optionally includes an output driver circuit configured to provide plurality of output signals responsive to the representation of output current of the voltage regulator using the bias control voltage.

In Example 7, the output driver circuit of any one or more of Examples 1-6 optionally includes a low-pass filter configured to receive the bias control voltage and a current sink configured to provide a drive current responsive to the output of the low-pass filter.

In Example 8, the dynamic bias generator of any one or more of Examples 1-2 optionally includes a plurality of output circuits configured to adjust a transfer function characteristic of a component of the voltage regulator in response to the drive current.

In Example 9, a method for adjusting a transfer function of voltage regulator based on load current of the voltage regulator can include receiving a signal over a first interval at a peak detector of a dynamic bias generator and at a slope generator of the dynamic bias generator, the signal at the first interval indicative of an increasing load current of the voltage regulator, charging a peak capacitor in response to the signal over the first interval to provide an increasing bias control voltage, wherein a rate of increase of the bias control voltage is determined by the slope generator, and expanding a bandwidth of a first amplifier of the voltage regulator in response to the increasing bias control voltage using a first output of the dynamic bias generator.

In Example 10, the method of any one or more of Examples 1-9 optionally includes receiving the signal over a second interval at the peak detector of the dynamic bias generator, the signal over the second interval indicative of a decreasing load current of the voltage regulator, discharging the peak capacitor in response to the signal over the second interval to provide a decreasing bias control voltage, wherein a rate of decrease of the bias control voltage is determined by a discharge current source coupled to the peak capacitor, and lowering a bandwidth of the first amplifier of the voltage regulator in response to the decreasing bias control voltage using the first output of the dynamic bias generator.

In Example 11, the method of any one or more of Examples 1-10 optionally includes adjusting a bias current of a second amplifier of the dynamic bias generator in response to the increasing bias control voltage using a second output of the dynamic bias generator.

In Example 12, the method of any one or more of Examples 1-11 optionally includes adjusting a gain of the second amplifier in response to the increasing bias control voltage using a third output of the in response to the increasing bias control voltage using a second output of the dynamic bias generator.

In Example 13, the method of any one or more of Examples 1-12 optionally includes adjusting compensation parameter of a compensation circuit of the dynamic bias generator in response to the increasing bias control voltage using a third output of the in response to the increasing bias control voltage using a second output of the dynamic bias generator.

In Example 14, the method of any one or more of Examples 1-13 optionally includes adjusting a bias current of a second amplifier of the dynamic bias generator in response to the decreasing bias control voltage using a second output of the dynamic bias generator.

In Example 15, the method of any one or more of Examples 1-14 optionally includes adjusting a gain of the second amplifier in response to the increasing bias control voltage using a third output of the in response to the decreasing bias control voltage using a second output of the dynamic bias generator.

In Example 16, the method of any one or more of Examples 1-15 optionally includes adjusting compensation parameter of a compensation circuit of the dynamic bias generator in response to the increasing bias control voltage using a third output of the in response to the decreasing bias control voltage using a second output of the dynamic bias generator.

In Example 17, a voltage regulator can include an error amplifier configured to receive a reference voltage and a representation of an output voltage of the voltage regulator and to provide an error signal indicative of a difference between the reference voltage and the representation of the output voltage, a compensation circuit configured to filter changes in the error signal, a buffer configured to receive the error signal and to provide a command signal, a power switch configured to receive the command signal and to couple an input voltage to an output of the voltage regulator to provide the output voltage, a mirror transistor coupled to the power switch and configured to provide a mirrored representation of output current of the voltage regulator, and a dynamic bias generator. In certain examples, the dynamic bias generator can include a slope generator and a peak detector coupled to the slope generator, wherein the slope generator and the peak detector are configured to receive the mirrored representation of the output current of the voltage regulator and to adjust a bias control voltage at an output of the peak detector in response to a change in the output current of the voltage regulator.

In Example 18, the dynamic bias generator of any one or more of Examples 1-17 optionally includes an output circuit, the output circuit configured to couple to a plurality of control nodes of the voltage regulator, the plurality of control nodes including a control node of the buffer, wherein the control node of the buffer is configured to adjust a bandwidth of the buffer.

In Example 19, the plurality of control nodes of any one or more of Examples 1-18 optionally includes one or more control nodes of the error amplifier, wherein the one or more control nodes of the error amplifier are configured to adjust bias current and gain of the error amplifier.

In Example 20, the plurality of control nodes of any one or more of Examples 1-19 optionally includes a control node of the compensation circuit, the control node of the compensation circuit is configured to adjust a filter of the compensation circuit.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A dynamic bias generator for a voltage regulator comprising:
- a slope generator;
- a peak detector configured to receive an output of the slope generator;
- wherein the slope generator and the peak detector are configured to receive a representation of output current of the voltage regulator and to adjust a bias control voltage at an output of the peak detector in response to a change in the output current of the voltage regulator;
- wherein the peak detector includes:
  - a first diode configured to receive the representation of the output current of the voltage regulator;
  - a detect capacitor coupled to the first diode and configured to charge when the representation of the output current indicates an increasing output current demand; and
- wherein a charge rate of the detect capacitor is determined by the slope generator.

2. The dynamic bias generator of claim 1, wherein the peak detector includes a discharge current source configured to discharge the detect capacitor when the output current indicates a decreasing output current demand.

3. The dynamic bias generator of claim 1, wherein the slope generator includes a second diode coupled in parallel with a slope generator resistance.

4. The dynamic bias generator of claim 1, including an output driver circuit configured to provide a plurality of output signals responsive to the representation of output current of the voltage regulator using the bias control voltage.

5. The dynamic bias generator of claim 4, wherein the output driver circuit includes:
- a low-pass filter configured to receive the bias control voltage; and
- a current sink configured to provide a drive current responsive to the output of the low-pass filter.

6. The dynamic bias generator of claim 5, including a plurality of output circuits configured to adjust a transfer function characteristic of a component of the voltage regulator in response to the drive current.

7. A method for adjusting a transfer function of voltage regulator based on load current of the voltage regulator, the method comprising:
- receiving a signal over a first interval at a peak detector of a dynamic bias generator and at a slope generator of the dynamic bias generator, the signal at the first interval indicative of an increasing load current of the voltage regulator;
- charging a peak capacitor in response to the signal over the first interval to provide an increasing bias control voltage, wherein a rate of increase of the bias control voltage is determined by the slope generator expanding a bandwidth of a first amplifier of the voltage regulator in response to the increasing bias control voltage using a first output of the dynamic bias generator.

8. The method of claim 7, including:
- receiving the signal over a second interval at the peak detector of the dynamic bias generator, the signal over the second interval indicative of a decreasing load current of the voltage regulator;
- discharging the peak capacitor in response to the signal over the second interval to provide a decreasing bias control voltage, wherein a rate of decrease of the bias control voltage is determined by a discharge current source coupled to the peak capacitor; and
- lowering a bandwidth of the first amplifier of the voltage regulator in response to the decreasing bias control voltage using the first output of the dynamic bias generator.

9. The method of claim 8, including adjusting a bias current of a second amplifier of the dynamic bias generator in response to the decreasing bias control voltage using a second output of the dynamic bias generator.

10. The method of claim 9, including adjusting a gain of the second amplifier in response to the increasing bias control voltage using a third output of the in response to the decreasing bias control voltage using a second output of the dynamic bias generator.

11. The method of claim 10, including adjusting compensation parameter of a compensation circuit of the dynamic bias generator in response to the increasing bias control voltage using a third output of the in response to the decreasing bias control voltage using a second output of the dynamic bias generator.

12. The method of claim 7, including adjusting a bias current of a second amplifier of the dynamic bias generator in response to the increasing bias control voltage using a second output of the dynamic bias generator.

13. The method of claim 12, including adjusting a gain of the second amplifier in response to the increasing bias control voltage using a third output of the in response to the increasing bias control voltage using a second output of the dynamic bias generator.

14. The method of claim 13, including adjusting compensation parameter of a compensation circuit of the dynamic bias generator in response to the increasing bias control voltage using a third output of the in response to the increasing bias control voltage using a second output of the dynamic bias generator.

15. A voltage regulator comprising:

an error amplifier configured to receive a reference voltage and a representation of an output voltage of the voltage regulator and to provide an error signal indicative of a difference between the reference voltage and the representation of the output voltage;

a compensation circuit configured to filter changes in the error signal;

a buffer configured to receive the error signal and to provide a command signal;

a power switch configured to receive the command signal and to couple an input voltage to an output of the voltage regulator to provide the output voltage;

a mirror transistor coupled to the power switch and configured to provide a mirrored representation of output current of the voltage regulator; and a dynamic bias generator, the dynamic bias generator including:

a slope generator; and a peak detector configured to receive an output of the slope generator;

wherein the slope generator and the peak detector are configured to receive the mirrored representation of the output current of the voltage regulator and to adjust a bias control voltage at an output of the peak detector in response to a change in the output current of the voltage regulator; and wherein the dynamic bias generator includes an output circuit, the output circuit configured to couple to a plurality of control nodes of the voltage regulator, the plurality of control nodes including a control node of the buffer, wherein the control node of the buffer is configured to adjust a bandwidth of the buffer.

16. The voltage regulator of claim 15, wherein the plurality of control nodes includes one or more control nodes of the error amplifier, wherein the one or more control nodes of the error amplifier are configured to adjust bias current and gain of the error amplifier.

17. The voltage regulator of claim 15, wherein plurality of control nodes includes a control node of the compensation circuit, the control node of the compensation circuit is configured to adjust a filter of the compensation circuit.

18. A dynamic bias generator for a voltage regulator comprising:

a slope generator;

a peak detector configured to receive an output of the slope generator;

wherein the slope generator and the peak detector are configured to receive a representation of output current of the voltage regulator and to adjust a bias control voltage at an output of the peak detector in response to a change in the output current of the voltage regulator;

an output driver circuit configured to provide a plurality of output signals responsive to the representation of output current of the voltage regulator using the bias control voltage; and wherein the output driver circuit includes:

a low-pass filter configured to receive the bias control voltage; and a current sink configured to provide a drive current responsive to the output of the low-pass filter.

19. The dynamic bias generator of claim 18, including a plurality of output circuits configured to adjust a transfer function characteristic of a component of the voltage regulator in response to the drive current.

* * * * *